United States Patent
Konzelmann

(10) Patent No.: US 9,339,751 B2
(45) Date of Patent: May 17, 2016

(54) FILTER FOR LIQUID OR GASEOUS MEDIA

(75) Inventor: Martin Konzelmann, Winterlingen (DE)

(73) Assignee: Karl Kuefner KG, Albstadt-Truchtelfingen (DE)

( * ) Notice: Subject to any disclaimer, the term of this patent is extended or adjusted under 35 U.S.C. 154(b) by 245 days.

(21) Appl. No.: 13/395,969

(22) PCT Filed: Sep. 15, 2010

(86) PCT No.: PCT/DE2010/001083
§ 371 (c)(1),
(2), (4) Date: Mar. 14, 2012

(87) PCT Pub. No.: WO2011/032539
PCT Pub. Date: Mar. 24, 2011

(65) Prior Publication Data
US 2012/0174548 A1    Jul. 12, 2012

(30) Foreign Application Priority Data

Sep. 15, 2009 (DE) .......... 10 2009 041 347

(51) Int. Cl.
*B01D 25/00* (2006.01)
*B01D 46/24* (2006.01)
*B01D 29/05* (2006.01)
*B01D 46/00* (2006.01)

(52) U.S. Cl.
CPC .......... *B01D 46/2403* (2013.01); *B01D 29/055* (2013.01); *B01D 2201/0415* (2013.01); *B01D 2201/4084* (2013.01); *B01D 2265/028* (2013.01); *B01D 2265/06* (2013.01)

(58) Field of Classification Search
None
See application file for complete search history.

(56) References Cited

U.S. PATENT DOCUMENTS

| | | | |
|---|---|---|---|
| 4,204,960 A | 5/1980 | Sugiyama et al. | |
| 5,169,524 A | 12/1992 | Meiritz et al. | |
| 5,820,754 A * | 10/1998 | Cassidy et al. | 210/232 |
| 7,041,217 B1 | 5/2006 | Close et al. | |
| 2009/0084727 A1 | 4/2009 | Yonezawa | |

FOREIGN PATENT DOCUMENTS

DE    90 16 138    2/1991
(Continued)

OTHER PUBLICATIONS

Japanese Office Action in JP 2012-529118, dated Nov. 19, 2013.
(Continued)

*Primary Examiner* — Allison Fitzsimmons
(74) *Attorney, Agent, or Firm* — Collard & Roe, P.C.

(57) ABSTRACT

A filter for liquid or gaseous media has a cylindrical form in the closed position and a curved form in the open position. The filter includes a frame and at least one filter element arranged on the frame. Two circumferential ends of the frame are provided with fixing elements for fixing to each other in the closed position. In a plurality of first sections of the frame the frame has a first wall thickness. In a plurality of second sections of the frame the frame has a second wall thickness less than the first wall thickness. The wall thicknesses are measured in the radial direction in the closed position of the filter, respectively with a second section between two first sections.

11 Claims, 1 Drawing Sheet

(56) References Cited

FOREIGN PATENT DOCUMENTS

Figure 1:
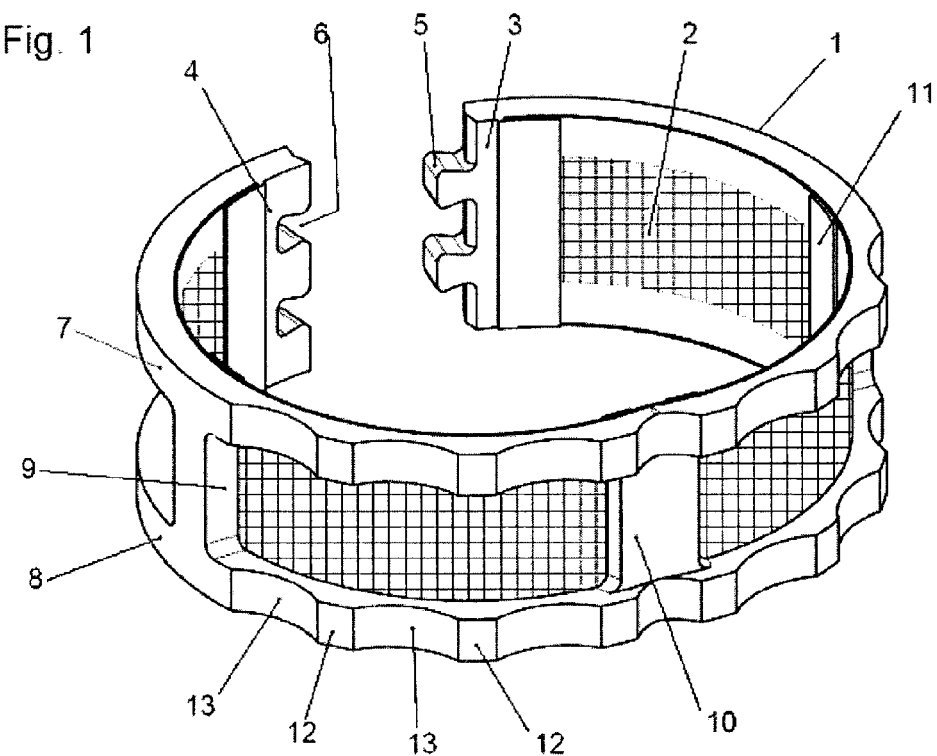

| | | |
|---|---|---|
| DE | 10 2008 049 052 | 4/2009 |
| EP | 0 487 845 | 6/1992 |
| JP | S51-149479 U | 11/1976 |
| JP | 2000 266235 | 9/2000 |
| JP | 2001-321612 A | 11/2001 |
| JP | 2002-285966 A | 10/2002 |
| JP | 2007-000791 A | 1/2007 |

OTHER PUBLICATIONS

International Search Report of PCT/DE2010/001083, date of mailing Mar. 4, 2011.
German Search Report in DE 10 2009 041 347.2 dated Dec. 27, 2009 with English translation of the relevant parts.
International Preliminary Report on Patentability in PCT/DE2010/001083 dated Mar. 29, 2012.

* cited by examiner

FILTER FOR LIQUID OR GASEOUS MEDIA

CROSS REFERENCE TO RELATED APPLICATIONS

This application is the National Stage of PCT/DE2010/001083 filed on Sep. 15, 2010, which claims priority under 35 U.S.C. §119 of German Application No. 10 2009 041 347.2 filed on Sep. 15, 2009, the disclosure of which is incorporated by reference. The international application under PCT article 21(2) was not published in English.

The invention relates to a filter for liquid or gaseous media having a cylindrical form in the closed position and a curved form in the open position and comprising a frame and at least one filter element arranged on the frame.

Such filters are also known as ring filters on account of their cylindrical form in the closed position. With respect to the closed position the filter is open on the face sides of the cylinder. The filter element consists of a filter material which has small filter element openings that allow the medium to flow through and is located on the jacket of the cylinder or is arranged parallel to the jacket of the cylinder. The cylinder is formed by the frame on which the filter element is arranged and held. These filters are mounted on cylindrical hollow bodies such as a shaft. The filter mounted on a hollow body can be inserted into a housing such as a valve housing. The housing can likewise have a cylindrical hollow body. The shaft may have a keyway for fixing. For arrangement of the filter on a shaft, the filter in the open position is placed around the shaft and the filter is subsequently brought into the closed position. The keyway on the shaft ensures that the filter is arranged firmly on the shaft and does not change its position undesirably.

The filters serve the filtration of liquids or gases flowing through the hollow body such as, for example, pressure and lubricating media, fuel, hydraulic oil, water, molten plastic or air. The filters keep back solids and other impurities and thereby protect components through which the liquid or gaseous media flow from damage or impairment.

Known such filters are provided with a frame having two annular frame elements. These are joined together by struts. The struts run parallel to the longitudinal axis of the cylindrical filter. They thereby run in an axial direction. On one of the cross struts is a notch that likewise runs in an axial direction. It extends into the annular frame elements. The notch is located between two sections of the frame, each of which forms a half cylinder. The cylinder is thereby halved in an axial direction. On the side opposite the notch the frame has two open ends that are provided with fixing means. The fixing means serve the detachable fixing of the ends to each other in the closed position of the filter. The notch serves as a hinge for opening the filter into the open position and expanding the filter. For opening and closing, one of the two semicylindrical sections is rotated around the notch relative to the other semicylindrical section.

These known filters have the disadvantage that the notch constitutes a bending point in the frame at which the material is considerably compressed and extended on opening and closing. This can lead to damage when the filter is incorporated that cannot be detected visually. Even before incorporation there may also be damage to the material in the area of the notch that is likewise not detected. Given the low material thickness in the area of the notch, damage may lead to the filter breaking apart under pressure stresses during use at the place of installation.

The object of the invention is to provide a filter for liquid and gaseous media that does not present the risk of damage to the material or of breaking apart on opening and closing.

This object is solved by a filter as described herein. In contrast to the known filters, the filter according to the invention has neither a bending point nor a notch but instead a plurality of first and second sections having different material thicknesses or depths. There is no need for a hinge as with the known filters. In the area of the first sections the frame has a first wall thickness or depth. In the area of the second sections the frame has a second wall thickness or depth. The wall thickness or depth in the closed position of the filter is determined in a radial direction. The depth coincides with the wall thickness of the frame. The first wall thickness is greater than the second wall thickness. A second section is located between each two first sections. First and second sections alternate. The second sections may, for example, be distributed across half or the entire circumference of the frame. The reduction in the wall thickness of the second sections compared with the wall thickness of the first sections is provided on the side of the frame showing to the outside. The outer side relates to the cylindrical form of the filter in the closed position and affects the jacket of the cylindrical form.

The number, the form and the position of the second sections can differ for various applications. Particularly advantageous are, for example, filters comprising at least three second sections in a segment of the filter in the closed position of 90°. If the second sections are distributed over half the cylindrical jacket of the filter, at least five second sections are advantageous. If the second sections are distributed over the whole cylindrical jacket of the filter, likewise at least seven second sections are advantageous.

The first and second sections are located on the annular frame elements of the annular filter. They may additionally be located on the struts that join the annular frame elements together.

In the following any reference to the closed position of the filter in connection with information in respect of the form or the position of components of the filter always relates to the cylindrical form of the filter in the closed position. The information in respect of the form and the position of the components of the filter can be better outlined in the closed position because in the closed position the filter according to the invention always has a cylindrical form. By contrast, in the open position the filter has a curved form, in particular that of a letter C, whereby the expansion of this form may vary.

The second sections with a lesser depth allow the filter according to the invention to expand better and more easily than known filters. A part of the frame is not swung or rotated around another part of the frame, but instead the whole frame is expanded, whereby the frame in the area of the second sections can be more easily deformed elastically on account of the lower wall thickness than in the area of the first sections. Instead of a bend at a point of the frame producing significant strain on the material, all second sections are easily deformed. The deformation is distributed across the entire circumference, in particular onto the area in which the second sections are located. The deformation is elastic, so that the frame returns to its curved initial position after the force triggering the expansion has ceased. The wall thickness of the second sections is greater than the wall thickness in the area of the notch or bending point of known filters. In this manner damage to the material when the filter is opened and closed, with the consequence of breaking apart under the effect of pressure, is avoided.

The first sections with a greater depth or wall thickness mean that the filter has the necessary stability to keep the filter element in the form provided and to fix the filter at the desired place of installation.

In an advantageous embodiment of the invention, the second sections are distributed evenly between the circumferential ends of the frame. First and second sections alternate regularly, whereby the width measured in the circumferential direction of all first sections is advantageously equal. This applies analogously for the second sections. The even expansion of the filter is thereby enabled.

In a further advantageous embodiment of the invention, the second sections are distributed over half of the frame. In this case an expansion by deformation particularly in the half of the frame having the second sections is possible.

In a further advantageous embodiment of the invention, the first and/or the second sections run in the axial direction of the filter in the closed position. Since an expansion of the filter leads to an enlargement of the radius of the cylindrical filter, a run of the second sections in the axial direction is particularly suitable. However, the second sections may also drift against the axial direction at an angle of more than 0° and less than 90°.

In a further advantageous embodiment of the invention, the filter element in the closed position is arranged on the side of the frame showing to the inside.

In a further advantageous embodiment of the invention, the side of the frame showing to the inside in the closed position is free of indentations and projections. The filter is thus particularly suitable for arrangement on the outer side of a shaft. Furthermore, the filter element can be fixed to the inner side without suffering damage. The frame of the filter fits closely with its inner side to the surface of a component, such as a shaft. In addition, in the closed position the side of the frame showing to the outside has on the second sections an indentation opposite the first sections. The indentation on the outer side allows the second sections to have a lesser wall thickness and depth compared with the first sections.

In a further advantageous embodiment of the invention, the side of the filter showing to the inside in the closed position has projections. These enable the interstitial space between the frame of the filter and the outer side of the component on which the filter is mounted to be flushed. The face sides of the frame of the filter fit closely to the flanks, oriented perpendicularly to the longitudinal axis, of the keyway of the component, so that an escape of the medium through the interstitial space between the frame of the filter and the component is prevented. The medium can only flow in and out through the filter element.

In a further advantageous embodiment of the invention, the second sections have a curve inwards in the closed position.

In a further advantageous embodiment of the invention, at least one part of the first sections is smaller than the adjacent second sections. This relates to the extension of the first and second sections in the circumferential direction of the cylinder formed by the filter in the closed position.

In a further advantageous embodiment of the invention, the frame has two parallel frame elements. In the closed position of the filter these are annular frame elements that are aligned parallel to each other. The first and second sections are part of the parallel frame elements.

In a further advantageous embodiment of the invention, the circumferential ends have as fixing means denticular elements that interlock positively in the closed state. The denticular elements permit the multiple opening and closing of the filter without the filter being damaged thereby.

In a further advantageous embodiment of the invention, the circumferential ends of the frame of the filter have as fixing means tongue and groove elements that interlock positively in the closed state. One circumferential end of the frame of the filter is provided with a groove or several sections with grooves. The other circumferential end is provided with one or more tongues or feathers that in the closed state fit positively in the groove of the one circumferential end of the frame.

Further advantages and advantageous embodiments of the invention can be obtained from the following description, the drawing and the claims.

DRAWING

Figure 2:
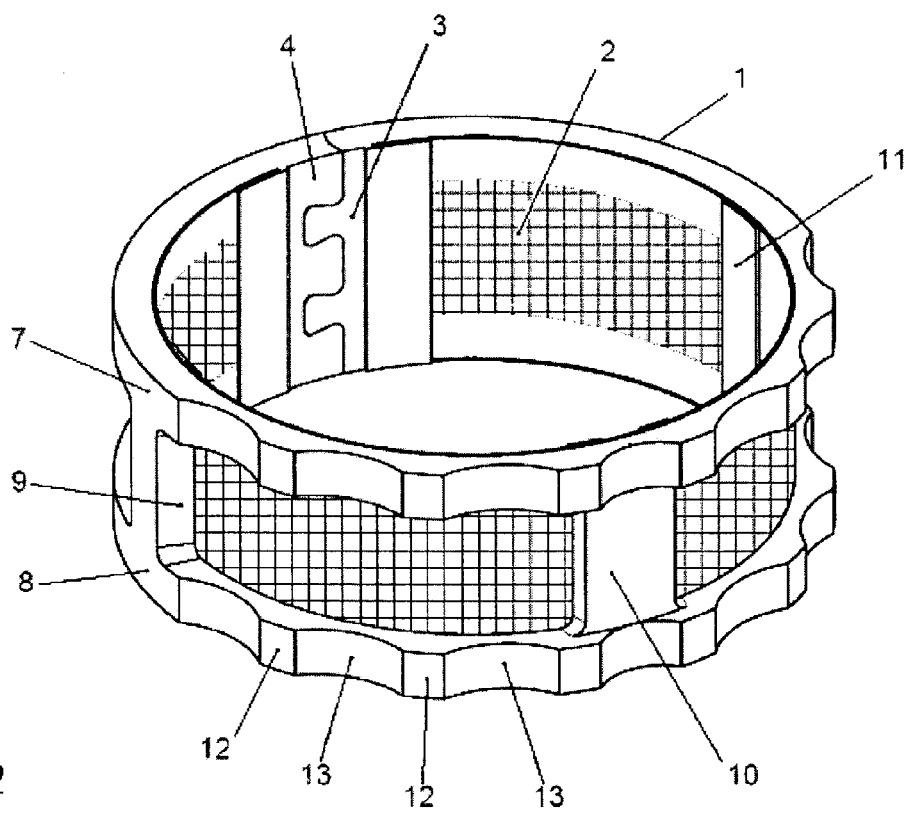

The drawing shows an embodiment of the invention. Illustrations:

FIG. 1 Perspective view of the filter in the open position,

FIG. 2 Perspective view of the filter according to FIG. 1 in the closed position.

DESCRIPTION OF THE MODEL EMBODIMENT

FIGS. 1 and 2 show a filter which in the closed position according to FIG. 2 has a cylindrical form and in the open position according to FIG. 1 has the curved form of a letter C. The filter comprises a frame 1 and a filter element 2 fixed to the frame. At the two circumferential ends 3 and 4 the frame is equipped with fixing elements 5 and 6 that in the closed position according to FIG. 2 interlock in denticular manner. To that end the fixing elements 5 and 6 have teeth and interstitial spaces between the teeth. The interstitial spaces of a fixing element are just large enough for a respective tooth of the other fixing element to fit positively in each respective interstitial space.

The frame 1 has two parallel frame elements 7 and 8 that in the closed position according to FIG. 2 are annular. The two frame elements 7 and 8 are joined to each other by means of struts 9, 10 and 11. The frame is equipped at the frame elements 7 and 8 with first sections 12 and second sections 13. The second sections 13 have a lesser depth and wall thickness than the first sections 12. The second sections 13 are curved or arched inwards on the frame side showing to the outside. This has the effect of reducing the wall thickness of the second sections 13 compared with the wall thickness of the first sections 12. The frame side showing to the inside is free of indentations and projections. The second sections 13 are greater in the circumferential direction than the first sections. The angle that is formed by a second section 13 is greater than the angle that is formed by a first section. The first and second sections 12 and 13 are distributed over half of the frame 1. In the other half the wall thickness of the frame is the same as the wall thickness of the first sections 12.

To open the filter the fixing elements 5 and 6 are detached from each other. The frame 1 is then expanded into an open position. This is illustrated in FIG. 1. The frame is deformed elastically particularly in the area of all second sections 13. Each of the second sections 13 is only deformed a little, so that no material stress occurs.

All features of the invention can be material to the invention both individually and in any combination.

REFERENCE NUMBERS

1 Frame
2 Filter element
3 Open end of the frame

4 Open end of the frame
5 Fixing element
6 Fixing element
7 Frame element
8 Frame element
9 Strut
10 Strut
11 Strut
12 First section
13 Second section

The invention claimed is:

1. A filter for liquid or gaseous media, the filter comprising a frame, the frame being movable between a closed position and an open position, the frame having a cylindrical ring shape in the closed position of the frame, the frame having a curved shape in a form of a letter C in the open position of the frame, the frame having a first longitudinal end, having a second longitudinal end opposite the first longitudinal end, and extending from the first longitudinal end to the second longitudinal end, the filter comprising a central opening running longitudinally through the frame from the first longitudinal end to the second longitudinal end, an inner side of the frame being adjacent to the central opening and an outer side of the frame being disposed opposite from the inner side of the frame and non-adjacent to the central opening, the filter comprising at least one filter element fixed to the frame, the at least one filter element comprising a filter material having small filter element openings to allow the liquid or gas media to flow through, the frame comprising a first circumferential end having a first fixing device and the frame comprising a second circumferential end having a second fixing device, the first fixing device and the second fixing device fixing to one another in the closed position to fix the first circumferential end to the second circumferential end, the first circumferential end and the second circumferential end being disposed at a midpoint of a first circumferential half of the frame, the frame comprising a plurality of first sections having a first wall thickness through a wall of the frame, the frame comprising a plurality of second sections having a second wall thickness through the wall of the frame, the second wall thickness being less than the first wall thickness, whereby the first wall thickness and the second wall thickness in the closed position of the filter are measured in a radial direction of the filter, wherein each second section of the plurality of second sections is disposed between two respective first sections of the plurality of first sections so that the two respective first sections are adjacent to the respective second section, wherein a reduction in the second wall thickness compared with the first wall thickness in the closed position is on the outer side of the frame, wherein a first section of the first sections has a first section circumferential length, wherein two second sections adjacent the first section each have a second section circumferential length, wherein the first section circumferential length is shorter than each second section circumferential length, wherein the second sections are distributed across a second circumferential half of the frame, and wherein the frame has a constant wall thickness through all of the first circumferential half of the frame.

2. The filter according to claim 1, wherein the second sections are distributed evenly in the second circumferential half of the frame.

3. The filter according to claim 1, wherein the first and/or second sections extend in an axial direction of the filter in the closed position.

4. The filter according to claim 1, wherein the filter element is arranged on the inner side of the frame in the closed position.

5. The filter according to claim 1, wherein the inner side of the frame is free of indentations and projections, and wherein on the outer side of the frame each second section forms an indentation compared with the respective two first sections adjacent to the respective second section.

6. The filter according to claim 1, wherein in the closed position the second sections have a curve inwards.

7. The filter according to claim 1, wherein the inner side of the frame in the closed position has projections.

8. The filter according to claim 1, wherein the frame has two parallel frame elements, and wherein the first and second sections are part of the parallel frame elements.

9. The filter according to claim 1, wherein the first fixing device and the second fixing device comprise denticular elements that interlock positively in the closed position.

10. The filter according to claim 1, wherein the first fixing device and the second fixing device comprise tongue and groove elements that interlock positively in the closed position.

11. The filter according to claim 1, wherein the constant wall thickness in the first circumferential half of the frame is equal to the first thickness of the first sections.

* * * * *